United States Patent [19]

Birli, Sr. et al.

[11] Patent Number: 4,887,429
[45] Date of Patent: Dec. 19, 1989

[54] ELECTRO-THERMAL ACTUATOR

[75] Inventors: Joseph A. Birli, Sr., Richmond Heights; Joseph A. Birli, Jr., South Euclid, both of Ohio

[73] Assignee: Design & Manufacturing Corporation, Willoughby, Ohio

[21] Appl. No.: 347,188

[22] Filed: May 4, 1989

[51] Int. Cl.[4] .............................................. F03G 7/06
[52] U.S. Cl. ........................................ 60/527; 60/531
[58] Field of Search ................... 60/527, 528, 530, 531

[56] References Cited

U.S. PATENT DOCUMENTS

| | | | |
|---|---|---|---|
| 3,991,572 | 11/1976 | Huebscher et al. | 60/531 |
| 4,016,722 | 4/1977 | Niederer, Sr. | 60/531 |
| 4,029,941 | 6/1977 | Huebscher et al. | 219/511 |
| 4,070,859 | 1/1978 | Sobecks | 60/530 |
| 4,079,589 | 3/1978 | Birli | 60/530 |
| 4,104,507 | 8/1978 | Tisone et al. | 219/513 |
| 4,759,189 | 7/1988 | Stropkay et al. | 60/531 |

Primary Examiner—Allen M. Ostrager
Attorney, Agent, or Firm—Leydig, Voit & Mayer

[57] ABSTRACT

An electro-thermal actuator has a boiler chamber in which a working fluid is heated to increase its pressure and a variable volume chamber defined in part by a rolling diaphragm. When the working fluid is heated to a sufficient temperature, the pressure within the variable volume chamber becomes large enough to force a spring-loaded piston rod out of the actuator by the rolling motion of the diaphragm. The boiler chamber communicates with the variable volume chamber through a flexible partition containing a normally closed opening consisting a single slit. The flexible partition absorbs external forces applied to the piston rod when it is extended without the rupture of any actuator parts. In addition, the flexible partition produces improved actuator response time.

31 Claims, 2 Drawing Sheets

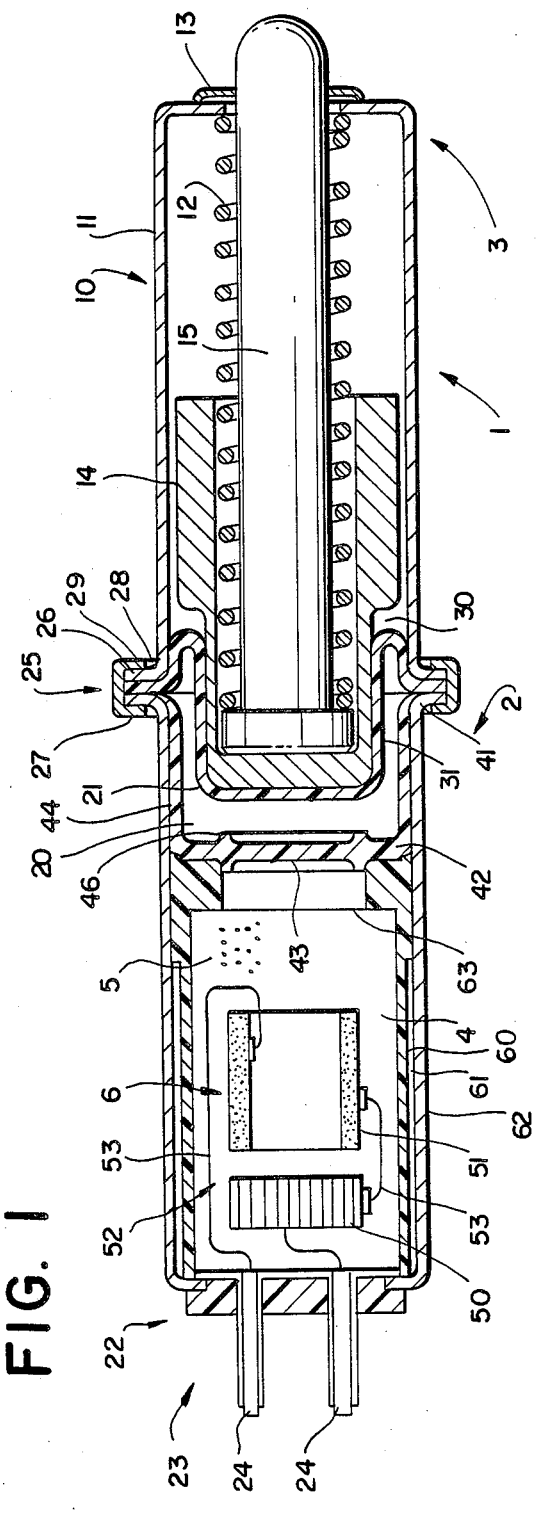
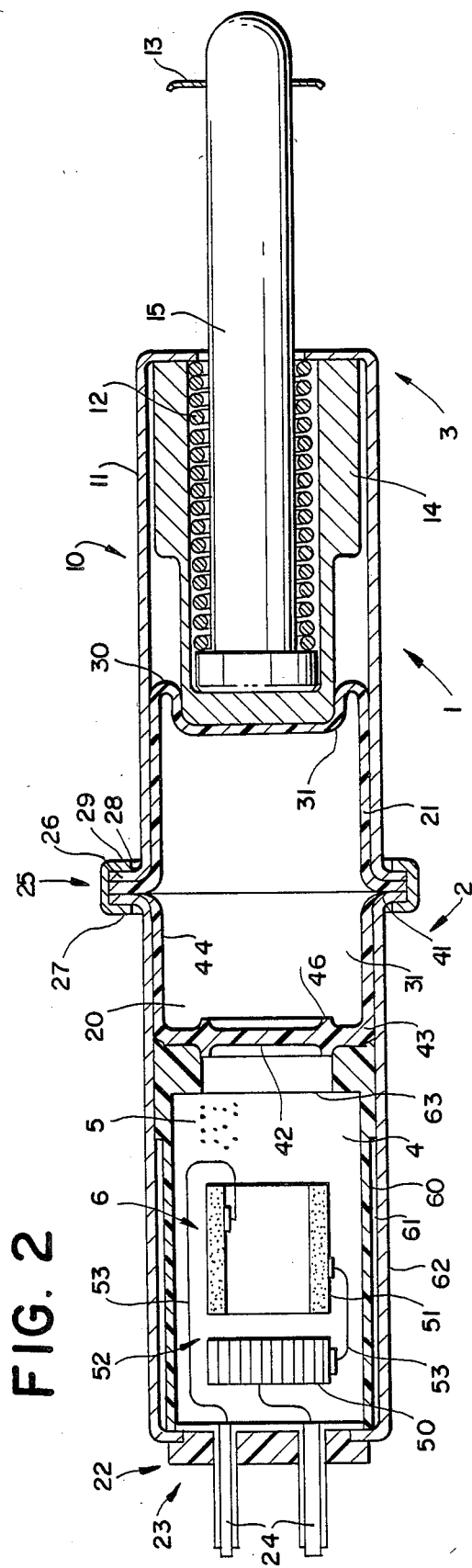

ELECTRO-THERMAL ACTUATOR

BACKGROUND OF THE INVENTION

Electro-thermal fluid displacement actuators that convert electrical energy into thermal energy and, in turn, employ the thermal energy to expand a thermally expandable fluid medium to do mechanical work are known. Examples of such actuators are described in commonly assigned U.S. Pat. Nos. 4,070,859, 4,079,589, 4,104,507 and 4,759,189. The disclosures of these patents are incorporated herein by reference.

In the type of electro-thermal actuator with which the invention is concerned, a working fluid is contained within a boiler chamber at one end of the actuator. Preferably, that fluid is liquid at room temperature. Upon being heated to a sufficient temperature, the working fluid changes from a liquid phase to a gas phase. The phase transition results in an increasing pressure within the boiler chamber so that some of the working fluid travels to a variable volume chamber within the actuator. The expanding working fluid presses against a diaphragm in the variable volume chamber, displacing the diaphragm which drives a piston that extends a piston rod from the actuator. The out-stroking motion of the piston may be employed to do work on or to engage an external device. A return spring mounted within the actuator biases the piston to retract the piston rod. As long as the pressure of the working fluid is sufficient to overcome the biasing force of the return spring, the piston rod remains extended from the actuator. When the working fluid cools, the pressure on the diaphragm is reduced and working fluid flows back into the boiler chamber. In response, the piston rod is retracted into the actuator by the biasing force applied by the return spring. The gaseous working fluid returns to the liquid phase when sufficiently cool.

In order to heat the working fluid and, preferably, to produce a phase change in the working fluid, an electrically driven heater is disposed within the boiler chamber. The heater may alternatively be a simple resistance heater that produces heat in response to a current flow through the heater. The heater may be a positive temperature coefficient (PTC) heating element that also is heated by a flow of electrical current through it. Since a PTC heating element significantly increases in resistance once it reaches a particular temperature, it inherently limits the magnitude of the steady state current that flows in response to a particular voltage applied to the heater. To improve actuator response time without excessive current flows, a resistance heater may be connected in series with a PTC heating element.

Each of the actuators described in the patents incorporated herein by reference includes a throttling-type valve disposed between the boiler and variable volume chambers. The valve comprises a rigid separator including one or more orifices through which the working fluid can pass. In these actuators, the diaphragm driving the piston assembly is usually pressed directly against the rigid separator by the return spring to close the orifices when the piston is retracted. That arrangement requires the force applied by the working fluid in the boiler chamber to equal that produced on the diaphragm by the return spring before the piston begins to move. This design provides a "snap-action" extension of the actuator piston rod.

In some applications excessive forces and vibrations are applied to the piston rod when it is in the extended position, i.e., when the working fluid is at a high pressure both in the boiler and variable volume chambers. When those external forces urge the extended piston rod toward its retracted position, large forces are applied to the rigid separator between the boiler and variable volume chambers. Those forces can shatter the separator. While the actuator can continue to function without an intact separator, the fragments from the shattering of the separator can puncture the diaphragm permitting the working fluid to escape. When the working fluid escapes, the operation of the actuator is severely impaired or destroyed.

SUMMARY OF THE INVENTION

Accordingly, it is a primary object of the invention to provide an electro-thermal actuator which can withstand vibrations and forces applied to an extended piston rod that urge it into the actuator without damage.

Another object of the present invention is to provide an electro-thermal actuator that has an improved resistance to external applied forces without a sacrifice in response time.

Yet another object of the invention is to provide an electro-thermal actuator that is simple in construction, that can replace existing actuators and that employs as many elements as possible in common with existing actuators.

According to the present invention, an electrothermal actuator includes a housing, a piston assembly disposed within the housing, a rolling diaphragm defining a portion of a variable volume within the actuator for driving the piston assembly, a boiler chamber for containing a working fluid, a heater disposed within the boiler chamber and a flexible, unitary partition separating the variable volume fluid chamber and the boiler chamber. The flexible partition includes a normally closed opening consisting of a slit. When the heater heats the working fluid and the pressure increases within the boiler chamber, the flexible partition is gradually distended by the different pressures applied to the partition. When the differential pressures are large enough, the slit opens allowing heated working fluid to rush from the boiler chamber into the variable volume chamber thereby rapidly pressurizing it and causing rapid extension of the piston rod from the actuator. When heat is no longer supplied to the boiler chamber, and the difference between the pressures applied to the flexible partition becomes large enough, the slit opens with the partition distended toward the boiler chamber. The working fluid returns to the boiler chamber under the influence of the rolling diaphragm driven by the return spring. The flexible partition is preferably spaced from the diaphragm in the retracted position of the piston.

The flexibility of the partition enables it to withstand vibrations and forces applied to the piston rod when it is fully extended. Those forces are absorbed by flexing of the partition and opening of the slit, if necessary, to allow pressurized working fluid to flow into the boiler chamber. The partition does not shatter and no sharp fragments that might puncture the diaphragm are produced. The normally closed, single slit opening of the flexible partition that acts as a shock absorber also produces a response time that is at least as short as the response time of an actuator containing a rigid separator.

BRIEF DESCRIPTION OF THE DRAWINGS

FIG. 1 is a sectional side view of an electrothermal actuator embodiment according to the present invention showing the piston rod in its retracted position.

FIG. 2 is a sectional side view of an electrothermal actuator embodiment according to the present invention showing the piston rod in its extended position.

DETAILED DESCRIPTION OF PREFERRED EMBODIMENT

Figure 3:
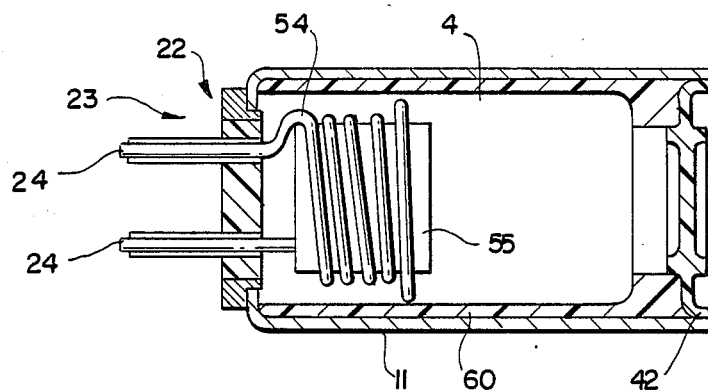
FIG. 3 is a sectional side view of a boiler chamber for an actuator according to the present invention showing an alternative heater construction.

In each of the drawing figures, like reference numbers designate like parts. FIGS. 1 and 2 are sectional side views of an electro-thermal actuator 1 in accordance with an embodiment of the present invention. In FIG. 1 a piston rod of the actuator is retracted and in FIG. 2 the piston rod is extended. Since the elements of the actuator are the same in FIGS. 1 and 2, it is not necessary to describe FIG. 2 in detail. Actuator 1 produces a linear mechanical stroke, but the invention may be employed with actuators that produce other strokes and mechanical outputs in response to the application of heat to the working fluid in the actuator.

Actuator 1 includes a fluidic portion 2 and a mechanical portion 3. The operation of the fluidic portion in response to electrical energization produces a mechanical output by the mechanical portion. Fluidic portion 2 includes a boiler chamber 4 containing a working fluid 5 and a heater assembly 6. Mechanical portion 3 includes a piston assembly 10 movable with respect to a hollow cylindrical housing 11 of the actuator. A return spring 12 urges the piston assembly into housing 11 and the retracted position of FIG. 1. A stopwasher 13 limits the retraction of the piston assembly into housing 11 by engaging the end of the housing. Piston assembly 10 includes a piston 14 and a piston rod 15 that are urged into engagement with each other by return spring 12.

Within housing 11 a variable volume chamber 20 is bounded on one side by a rolling elastomeric diaphragm 21, for example, of the type described in the patents incorporated herein by reference. The volume of chamber 20 varies depending upon the position of piston assembly 10 and diaphragm 21.

A fluid-tight seal 22 is disposed in housing 11 at the end opposite piston rod 15. Electrical terminals 24 pass through seal 22 for supplying electrical current to heater assembly 6. Housing 11 includes two sections that are connected to each other at a junction 25. At junction 25, a flange 26 of diaphragm 21 and an annular mounting flange 41 of a flexible partition 42 (described below) are compressed and held between the flanges 27 and 28 of two housing sections by a crimp ring 29. Ring 29 forms a fluidtight seal for chamber 20. Diaphragm 21 includes an annular fold 30 along which it rolls during extension and retraction of piston rod 15. Diaphragm 21 also includes a cylindrical portion 31 into which piston 14 fits for supporting the diaphragm and for driving piston 14 to produce the linear sliding of piston rod 15.

A flexible partition 42 separates boiler chamber 4 from variable volume chamber 20. Partition 42 is a unitary cup-shaped article including a end wall 43 from which a cylindrical side wall 44 extends. Side wall 44 includes annular, peripheral flange 41 opposite end wall 43 for the mounting of the partition in junction 25. End wall 43 of partition 42 includes a normally closed opening consisting of a single linear slit 45. Slit 45 is cut entirely through the thickness of partition 42 without the removal of any material of partition 42 and is preferably centrally disposed in end wall 43. End wall 43 includes annular stiffening protrusions 46 projecting outwardly from both of the opposed sides of the end wall. In the assembled actuator, one of the protrusions 46 is directed towards each of the boiler chamber 4 and the variable volume chamber 20. Slit 45 is surrounded by annular protrusions 46. The annular protrusion 46 that is oriented toward boiler chamber 4 also assists in properly positioning partition 42 in a boiler chamber sleeve 60 (described below).

The embodiment of the actuator shown in FIG. 1 includes in heater assembly 6 a conventional resistance heater 50, which may be a spiral wound coil, connected in series with a PTC heater 51. The heater assembly 52 is connected by leads 53 to terminals 24 so that an electrical current can be supplied to the heater assembly. An alternative heater assembly is shown in FIG. 3. There a helical wound resistance coil 54 is disposed on a high temperature form 55. Alternatively, form 55 can be a PTC element connected in series with coil 54. In either of the heater embodiments shown in FIGS. 1 and 3, a PTC element or a resistance heater may be used without the other. In any event, electrical current supplied through terminals 24 to heater assembly 52 causes the working fluid 5 in boiler chamber 4 to increase in temperature. In the preferred embodiment that temperature increase causes the working fluid to change phase from a liquid to a gas producing increased pressure within boiler chamber 4.

Preferably, a sleeve 60 is disposed within the housing wall 62 of the actuator, defining the boiler chamber. Liner 60 is preferably plastic or a plasticlike thermal insulator that retains heat within boiler chamber 4. The effectiveness of the insulation can be improved by including an air space 61 between wall 62 of housing 11 and liner 60. Air space 61 is optional and, for instance, is not present in the boiler chamber embodiment shown in FIG. 3. Sleeve 60 includes a central opening 63 directed toward the variable volume chamber 20. That opening is closed by end wall 43 of partition 42. Preferably, an annular protrusion 46 of partition 42 snugly engages opening 63 to achieve and maintain the desired position and alignment of partition 42 at the open end of boiler chamber 4.

In operation, an electrical signal is applied to terminals 24 to produce an electrical current flow through the heater assembly within boiler chamber 4. The resulting rise in temperature rapidly heats the working fluid converting some of it from a liquid to a gas and increasing the pressure within the boiler chamber. Since there is no corresponding increase in pressure in variable volume chamber 20, different pressures are exerted on the opposite sides of end wall 43 of partition 42. That differential pressure causes flexible, end wall 43 to be distended in the direction of diaphragm 21. Preferably, partition 42 is an elastomeric material, such as a silicone rubber, that can undergo elastic deformation without permanent dimensional change. As the pressure grows within boiler chamber 4, flexible end wall 43 is distended further so that the flaps along the normally closed slit 45 are pressed increasingly tightly against each other. When the differential pressure and distention of end wall 43 become large enough, the contact between the edges of slit 44 is reduced so that they abruptly part. The normally closed opening is thus opened allowing the pressurized working fluid to rush into variable volume chamber 20. That sudden increase in pressure in chamber 20 overcomes the biasing force of spring 12 and forces piston rod 15 to its extended position as shown in FIG. 2.

When piston rod 15 is in the extended position of FIG. 2 and external forces are applied urging the piston rod toward the retracted position of FIG. 1, the pressurized working fluid in variable volume chamber 20 transmits the forces to end wall 43 of partition 42. End wall 43 yields in response to those forces to the extent necessary to dissipate them. If the forces are large enough, slit 45 opens and the working fluid is forced back into boiler chamber 4. Even relatively sharply applied forces can be absorbed by partition 42 because end wall 43 can flex and can open slit 45 quickly. These shock absorbing characteristics prevent the shattering of internal actuator parts in response to the external forces so that the novel actuator is far more rugged that the previously known actuators.

The improved resistance of the actuator to externally applied forces may be achieved without sacrifice in the response time of the actuator. The response time is the time that elapses from the initial application of electrical current to terminals 24 until piston rod 15 is fully extended. In the novel actuator partition 42 contains the pressurized working fluid in boiler chamber 4 until the pressure reaches a relatively high value and then suddenly releases that pressure. Therefore, the response time of actuator 1 is as short as that of prior art actuators.

Figure 4:
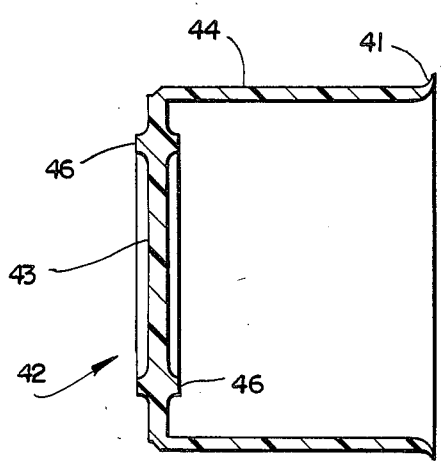
FIG. 4 is an enlarged sectional side view of an embodiment of a unitary flexible partition according to an embodiment of the invention.
Figure 5:
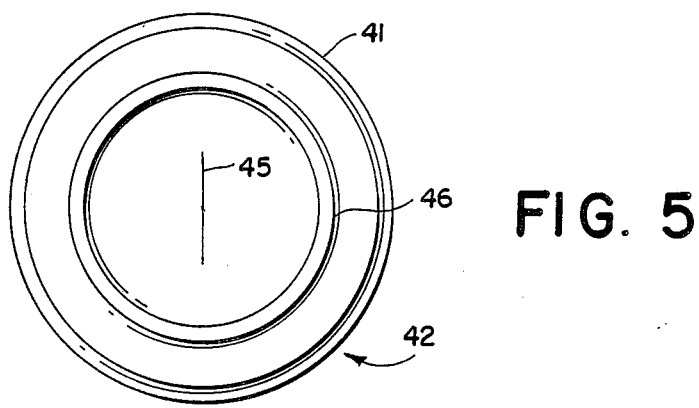
FIG. 5 is an end view of the flexible partition of FIG. 4.

The characteristics of the novel actuator are sensitive to the flexibility, i.e., the resilience, of partition 42. A silicone rubber having a durometer number of 55 to 70, and most preferably about 60, with a wall thickness of about 0.035 inches has proven useful in the invention. A single linear slit 45 cut entirely through end wall 43 without the removal of any material from the partition has provided superior performance. For example, a conventional actuator having a 0.75 inch stroke and a heater assembly consisting of a PTC element has a response time of about seven seconds. (See FIGS. 4A and 6A of U.S. Pat. No. 4,759,189.) In an actuator according to the invention that is the same as that reported in U.S. Pat. No. 4,759,189 except for the substitution of a unitary flexible partition having a single slit for a rigid separator having an orifice, the response time is 5.5 seconds. Thus, the desired shock absorbing characteristics are achieved in the invention not only without a loss of response time, but actually with an response time that is improved by twenty percent.

We have experimented with various flexible partition designs, but none is as effective in absorbing shock without reducing response time as is a unitary flexible partition including a normally closed opening consisting of a single slit. A unitary partition is preferred because a two part partition consisting of a cylindrical collar and a separate flexible end wall did not perform well, possibly because of working fluid leakage between the two parts. Likewise, a unitary flexible partition having an opening consisting of two intersecting slits did not show a significant improvement in actuator response time as the flexible partition having a single slit opening did. We are not certain why the response time of an actuator with a partition having two slits is inferior to one employing a partition with one slit. Perhaps the two intersecting slits create flaps having unrestrained edges, i.e., corners, that are not normally tightly closed and/or that yield at lower differential pressures. Flexible partitions having single slits in shapes other than straight lines may be employed in the invention. However, the more complex the shape of the slit the more likely that unrestrained flap edges will be produced, possibly adversely affecting response time.

As shown in FIG. 1, diaphragm 21 is preferably spaced from partition 42 when piston rod 15 is fully retracted. In the invention it is not necessary that the diaphragm block or cover any orifice in the partition, in contrast to the rigid separator structure described in U.S. Pat. No. 4,079,589. The separation between diaphragm 21 and partition 42 may contribute to the rapid motion of piston rod 15 by permitting the pressure in variable volume chamber 20 to rise rapidly before the displacement of piston assembly 10 begins.

When current is no longer supplied to the header assembly through terminals 24, the working fluid cools, the pressure within the boiler and variable volume chambers drops and the working fluid begins condensing. The force applied by return spring 12 through the working medium to partition 43 creates a differential pressure that causes end wall 43 to be distended in the direction of boiler chamber 4. That force eventually opens slit 45 and drives the working fluid back into boiler chamber 4 allowing the retraction of piston rod 15. In general, the retraction time of the piston rod is of less importance than the time required for its extension so that any delay in the retraction time introduced by partition 42 is of no significance.

The improved resistance of the novel actuator to external forces permits use of actuators in applications where electro-thermal actuators previously were inadequate. Moreover, the novel actuator advantageously uses nearly all of the same components of the prior art actuators. Therefore, the novel actuators can be produced with known manufacturing equipment and processes without significant cost increases and can directly replace existing actuators. The invention has been described with respect to certain preferred embodiments. Various additions and modifications within the spirit of the invention will occur to those of skill in the art. Accordingly, the scope of the invention is limited solely by the following claims.

We claim:
1. An electro-thermal actuator comprising:
a housing;
a variable volume fluid chamber disposed in said housing formed in part by a diaphragm;
a piston assembly including a piston rod partially disposed in said housing on a side of said diaphragm opposite said variable volume fluid chamber, said piston assembly being movable by said diaphragm to force said piston rod out of said housing;
a boiler chamber disposed in said housing containing a thermally expandable working fluid;
heating means disposed in said boiler chamber for heating said working fluid in response to the flow of an electrical current through said heating means to move said diaphragm, thereby extending said piston rod from said housing; and a flexible partition separating the variable volume fluid chamber and the boiler chamber for absorbing external forces applied to said piston rod, said partition having a normally closed opening therethrough consisting of a slit, said working fluid flowing between said variable volume fluid chamber and said boiler chamber when differential fluid pressures distend said partition and open the slit.

2. The actuator of claim 1 wherein said piston assembly includes a spring biasing said piston toward said partition and urging said piston rod to a retracted position.

3. The actuator of claim 2 wherein said diaphragm and said partition are spaced apart in said housing when said piston rod is in the retracted position.

4. The actuator of claim 1 wherein said partition is unitary and includes a end wall and a cylindrical side wall.

5. The actuator of claim 4 wherein said side wall includes an annular peripheral mounting flange opposite said end wall.

6. The actuator of claim 4 wherein said end wall includes an annular stiffening protrusion and the slit is surrounded by said protrusion.

7. The actuator of claim 1 wherein the slit lies along a straight line.

8. The actuator of claim 1 wherein said partition is an elastomer having a durometer number of 55 to 70.

9. An actuator of claim 1 wherein said partition is a silicone rubber.

10. The actuator of claim 1 wherein said heating means includes a positive temperature coefficient material that increases in resistance with temperature for limiting the current flow through the temperature of said heating means.

11. An electro-thermal actuator comprising:
a housing;
a boiler chamber disposed within said housing;
a thermally expandable working fluid disposed in said boiler chamber;
heating means disposed in said boiler chamber for heating said working fluid in response to the flow of electrical current through said heating means;
an elastomeric diaphragm disposed within and attached to said housing outside said boiler chamber, said diaphragm transforming pressure changes into forces;
a return spring disposed within said housing for biasing a piston rod;
a piston assembly partially disposed within said housing including a piston rod moving to an extended position in response to a force applied by said diaphragm and a retracted position in response to the biasing force applied by said return spring; and
a flexible partition disposed in said housing between said boiler chamber and said diaphragm for absorbing external forces applied to said piston rod having a normally closed opening therethrough consisting of a slit, said working fluid flowing out of said boiler chamber to apply pressure to said diaphragm when differential fluid pressures distend said partition toward said diaphragm and open the slit.

12. The actuator of claim 11 wherein said diaphragm and said partition are spaced apart in said housing when said piston rod is in the retracted position.

13. The actuator of claim 11 wherein the slit lies along a straight line.

14. The actuator of claim 11 wherein said partition is unitary and includes a end wall and a cylindrical side wall.

15. The actuator of claim 14 wherein said side wall includes an annular peripheral mounting flange opposite said end wall.

16. The actuator of claim 14 wherein said end wall includes an annular stiffening protrusion and the slit is surrounded by said protrusion.

17. The actuator of claim 11 wherein said partition is an elastomer having a durometer number of about 55 to 70

18. An actuator of claim 11 wherein said partition is a silicone rubber.

19. The actuator of claim 11 wherein said heating means includes a positive temperature coefficient material that increases in resistance with temperature for limiting the current flow through and the temperature of said heating means.

20. An electro-thermal actuator comprising a boiler chamber for containing a thermally expandable working fluid, a movable member responsive to expansion of the working fluid to provide a mechanical output from the actuator, heating means disposed in said boiler chamber for heating the working fluid in response to the flow of an electrical current through said heating means, and a flexible partition separating said boiler chamber from said movable member for absorbing external forces applied to said movable member and having a normally closed opening therethrough consisting of a single slit, the working fluid flowing out of and into said boiler chamber when differential pressures distend said flexible partition and open the slit.

21. The actuator of claim 20 wherein said movable member includes a linearly slidable piston.

22. The actuator of claim 21 wherein said movable member comprises an elastomeric rolling diaphragm, said piston being disposed relative to said diaphragm to move in response to pressure changes produced in said boiler chamber.

23. The actuator of claim 21 wherein said piston assembly includes a spring biasing said piston toward said partition and urging said piston rod to a retracted position within said housing.

24. The actuator of claim 23 wherein said diaphragm and said partition are spaced apart when said piston rod is in the retracted position.

25. The actuator of claim 20 wherein said partition is unitary and includes a end wall and a cylindrical side wall.

26. The actuator of claim 25 wherein said side wall includes an annular peripheral mounting flange opposite said end wall.

27. The actuator of claim 25 wherein said end wall includes an annular stiffening protrusion and the slit is surrounded by said protrusion.

28. The actuator of claim 20 wherein the slit lies along a straight line.

29. The actuator of claim 20 wherein said partition is an elastomer having a durometer number of 55 to 70.

30. An actuator of claim 20 wherein said partition is a silicone rubber.

31. The actuator of claim 20 wherein said heating means includes a positive temperature coefficient material that increases in resistance with temperature for limiting the current flow through and the temperature of said heating means.

* * * * *